United States Patent [19]

Lauwers

[11] Patent Number: 5,097,774

[45] Date of Patent: Mar. 24, 1992

[54] METHOD FOR BURNING HALOGENATED HYDROCARBON CONTAINING WASTE

[75] Inventor: Eddy J. Lauwers, Kalmthout, Belgium

[73] Assignee: Union Carbide Industrial Gases Technology Corporation, Danbury, Conn.

[21] Appl. No.: 711,052

[22] Filed: Jun. 6, 1991

[51] Int. Cl.⁵ .............................................. E23G 7/04
[52] U.S. Cl. ..................... 110/346; 110/238; 423/DIG. 20; 431/190
[58] Field of Search ............... 110/238, 346, 342; 431/190, 4; 423/481, 488, DIG. 20

[56] References Cited

U.S. PATENT DOCUMENTS

| | | | |
|---|---|---|---|
| 3,807,932 | 4/1974 | Dewald | 431/2 |
| 4,073,871 | 2/1978 | Optiz et al. | 431/5 |
| 4,198,384 | 4/1980 | Robinson | 423/488 |
| 4,233,280 | 11/1980 | Langens et al. | 423/481 |
| 4,462,318 | 7/1984 | Carbeau et al. | 110/238 |
| 4,520,741 | 6/1985 | Carbeau et al. | 110/344 |
| 4,628,835 | 12/1986 | Wollner | 110/238 |
| 5,008,098 | 4/1991 | Bernadiner | 110/238 X |

OTHER PUBLICATIONS

"BASF Process for the Incineration of Liquid Chlorinated Hydrocarbons", by BASF Antwerpen N.S., Scheldelaan, B-2040 Antwerpen, no date.
Stauffer-BASF Process.

Primary Examiner—Edward G. Favors
Attorney, Agent, or Firm—Chung K. Pak

[57] ABSTRACT

The invention relates to a process for obtaining a substantially homogenous temperature profile along the length of an incinerator during the incineration of halogenated waste containing materials comprising:
(a) providing a mixture containing an aqueous solution and halogenated waste having a preselected heating value;
(b) introducing said mixture into the incinerator in the presence of oxidant to engender a flame; and
(c) spraying an aqueous solution into or around the flame.

10 Claims, 1 Drawing Sheet

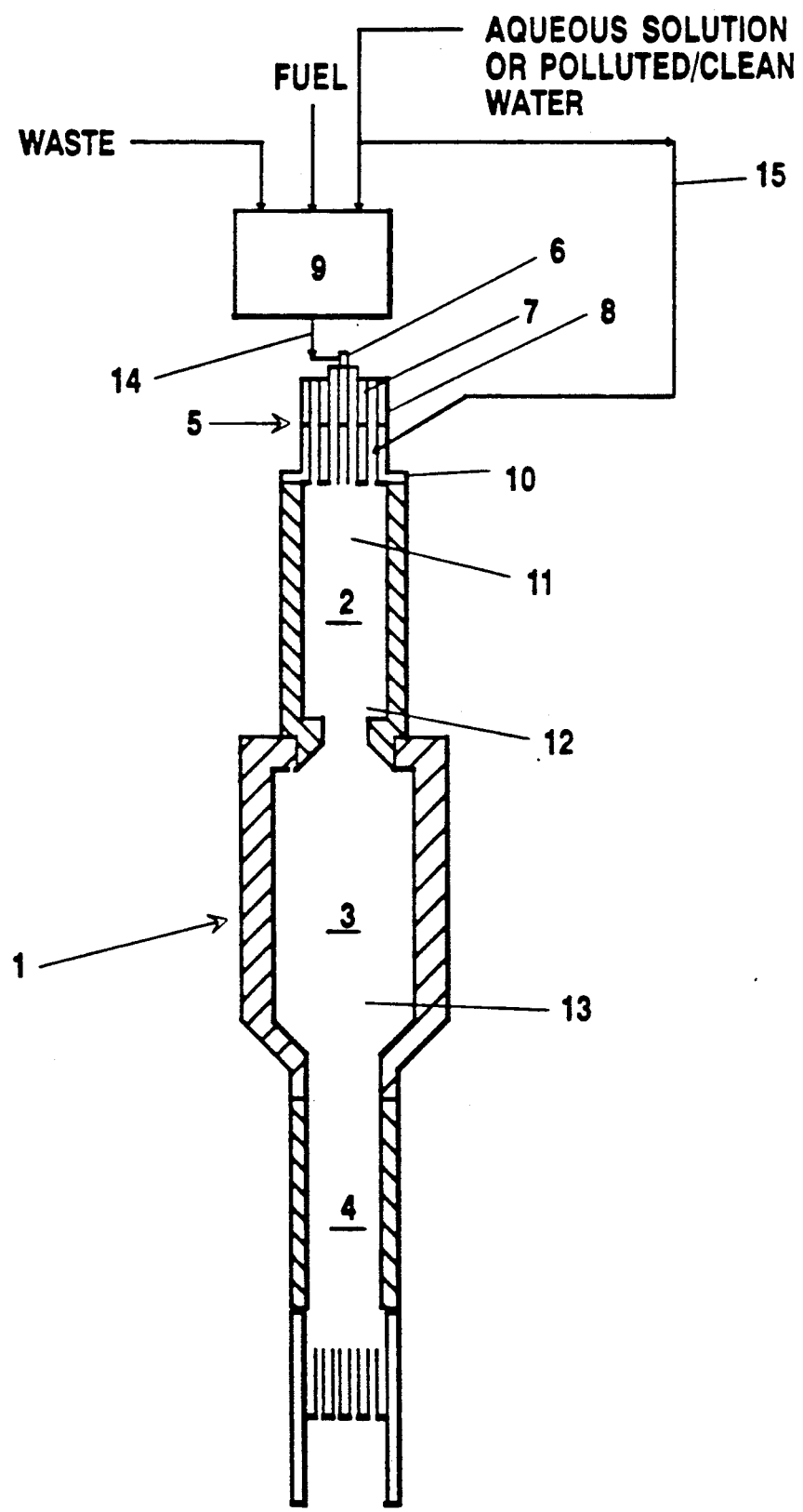

METHOD FOR BURNING HALOGENATED HYDROCARBON CONTAINING WASTE

FIELD OF THE INVENTION

The present invention relates in general to methods for regulating and controlling the temperature and the flame length in halogenated waste containing material incineration processes and more specifically to methods for obtaining a substantially homogeneous temperature profile and a desired flame length in chlorinated hydrocarbon waste incineration processes.

BACKGROUND OF THE INVENTION

Commonly, halogenated waste materials are disposed of via burning at high temperatures. The halogenated waste materials are initially combusted at high temperature conditions to form halogen containing flue gas. The halogen in the resulting flue gas is then generally recovered in the form of acid. By recovering the halogen, the cost involved in disposing the waste materials and in providing halogen materials to halogen utilizing processes can be substantially reduced.

It has been known to use air burners to incinerate halogenated waste materials. This technique, however, is inefficient for a number of reasons. First, a high incineration temperature, i.e. above 1,300° C., is difficult to obtain unless a substantial amount of additional rich fuel is provided. The use of a substantial amount of additional rich fuel, however, may not be feasible due to the cost involved. Second a short residence time is obtained due to the formation of a large volume of combustion gases (flue gas). The residence time is a function of the sizes of incineration equipment and the volume of combustion gases formed. When the volume of combustion gases is increased in a given incineration system, the residence time is correspondingly decreased. The failure to obtain a long residence time may adversely affect the incineration of halogenated waste materials. It should be noted the both the longer residence time and high incineration temperature are desirable not only to increase the rate at which halogenated waste materials are incinerated but also to insure the complete destruction of the halogenated waste materials.

It has been, therefore, proposed in U.S. Pat. No. 4,233,280 and in an article on "BASF Process" by Stauffer Chemical Company that oxygen, instead of air, be employed to incinerate halogenated waste at a pressure of about 7.5 barg. The use of oxygen at this pressure provides a temperature as high as 2,500° C. and reduces the amount of a flue gas formed due to the absence of nitrogen. As a result of a high temperature and of a decreased volume of the flue gas, the residence time of the flue gas in a postcombustion zone, i.e. a reaction zone, is advantageously increased. The combined effect of higher pressure, high temperature and increased residence time leads to a higher conversion of the halogen in the flue gas into the corresponding acid. The use of oxygen, however, requires means by which high temperature conditions and flame sizes can be controlled such that damage to the refractory wall of the incinerator is prevented. Building an external cooling jacket around the combustion and postcombustion zones of the incinerator is taught by U.S. Pat. No 4,233,280 and the above Stauffer Chemical company article. The use of the external cooling jacket, however, is constrained by the availability of heat exchange surface areas and the heat conductivity of refractory walls around the combustion zone of an incinerator. The difficulty of utilizing the jacket to avoid the risk of damage to the refractory wall of an incinerator is especially evident when a Particular area subject to high heat needs to be cooled in a localized or concentrated fashion.

To correct these shortcomings, the flame resulting from combustion of chlorinated waste materials in the presence of oxygen may be directly cooled with water. By spraying water towards the flame, the temperature and the length of the flame in an incinerator could be regulated and controlled. A desired temperature could, for example, be obtained at the top of the combustion zone while preventing the risk of damage to the refractory wall. This desired temperature, however, may not be maintained throughout the incinerator or throughout the combustion zone of the incinerator. In fact, the temperature decreases sharply from the top of the combustion zone to a downstream postcombustion zone, i.e. a reaction zone, thereby limiting the conversion of the halogen into acid and the corresponding incineration throughput.

As used herein the term "the incineration throughput" means a rate at which the waste is incinerated.

SUMMARY OF THE INVENTION

The present invention represents an improvement in a process for incinerating halogenated waste materials, particularly chlorinated hydrocarbon containing waste materials. By being able to maintain a substantially homogeneous temperature profile and the optimum length of a flame within an incinerator having combustion and postcombustion zones the incineration throughput and the conversion rate of the halogen in a flue gas are substantially increased without causing damage to the refractory wall of said incinerator. There is no need to increase the pressure of the incinerator as required by the "BASF Process" of Stauffer Chemical Company since halogenated waste materials can be incinerated at atmospheric or higher pressure in the present invention.

According to one embodiment of the present invention, this improvement is accomplished by:

A process for regulating or controlling the temperature and the flame length at atmospheric or higher pressures in an incinerator having combustion and postcombustion zones comprising:
  (a) mixing halogenated waste materials with a first agueous stream to form a mixture having a preselected heating values.
  (b) introducing said mixture into said combustion zone in the presence of oxidant to engender a flame; and
  (c) spraying a second aqueous stream directly into said flame.

According to another embodiment of the present invention, the improvement is achieved by:

A process for obtaining a substantially homogeneous temperature along the length of an incinerator during the incineration of halogenated waste comprising:
  (a) providing an oxygen burner having at least three pipes which are arranged coaxially to each other;
  (b) introducing a mixture containing halogenated waste and water into a combustion zone of said incinerator through the innermost pipe of said oxygen burner;

(c) introducing oxidant into said combustion zone through an internal annulus formed by a concentrically placed second pipe;
(d) introducing additional oxidant through an external annulus formed by a concentrically placed third pipe;
(e) producing a flame by combusting said mixture in the presence of said oxidants; and
(f) spraying an agueous solution directly into or around said flame via nozzle means located within the external annulus.

As used herein the term "postcombustion zone" means a reaction zone in which the halogen and $H_2O$ vapor in a flue gas are reacted with one another to form the corresponding halogen acid.

As used herein, the term "oxidant" means air, oxygen enriched air or pure oxygen. The preferred oxidant contains at least about 25% by volume oxygen.

As used herein, the term "an aqueous solution" means pure water, chemically contaminated water or any water containing or water releasing solutions.

BRIEF DESCRIPTION OF THE DRAWING

The sole figure is a schematic representation of one embodiment of the invention wherein an incinerator having combustion and postcombustion zones is employed in conjunction with a venturi mixer.

DETAILED DESCRIPTION OF THE INVENTION

The present invention comprises the discovery that temperature uniformity and optimum flame lengths can be achieved while high incineration temperature which can result from using an oxygen burner can be simultaneously moderated or reduced to avoid damage to the refractory wall of an incinerator. Obtaining temperature uniformity, i.e. a substantially homogeneous temperature profile along the length of an incinerator, and optimum flame lengths have been found to be possible when the flame resulting from combustion of a waste in the presence of oxygen is cooled by an aqueous solution in a substantially homogeneous manner.

This combination of said temperature uniformity, optimum flame lengths, temperature moderation and the optimum amount of the resulting water vapor enables the attainment of the beneficial results expressed as higher throughput rate and higher halogen conversion yield.

In the Figure, there is illustrated one preferred embodiment of the invention wherein the combustion is carried out as part of an incineration process. Referring to the figure, an incinerator (1) having a combustion zone (2), a reaction zone (3) and a quenching zone (4) is schematically illustrated. An oxygen burner (5) made up of three pipes (6, 7 and 8) arranged in a coaxial or concentrical manner is mounted on top of the incinerator (1) to burn a waste containing halogenated waste materials in the combustion zone (2) which is operated at a temperature of about 1,400° C. to about 1,550° C. It should be noted, however, that any effective oxygen burner, particularly the aspirating burner described and claimed in U.S. Pat. Nos. 4,378,205—Anderson and 4,451,796—Anderson, can be employed in the operation of this invention.

A mixture containing halogenated waste and an aqueous solution, which could be derived from a venturi mixer (9) or equivalents thereof, is pumped through the conduit (14) and introduced into the combustion zone (2) through the innermost pipe (6) of the oxygen burner (5). The amount of water in the mixture should be such that a heating value of the mixture is in the range of about 800 kcal/kg to about 3,500 kcal/kg, preferably in the range of about 1,200 kcal/kg to about 1,600 kcal/kg, more preferably in the range of about 1,500 kcal/kg. The amount and type of halogenated waste materials in the mixture may vary depending on the source involved. The preferred halogenated waste material to be incinerated, however, is chlorinated hydrocarbon waste in liquid form.

Oxidant is provided into the combustion zone (2) through an internal annulus formed by placing a second pipe (7) concentrically over the innermost pipe (6). Additional oxidant could also be provided through an external annulus which is formed by placing a third pipe (8) concentrically over the second pipe (7) The oxidant, however, can be introduced into the combustion zone (2) in any other effective manner, for instance, through the sidewall of the combustion zone (2). The oxidant employed could be technically pure oxygen having an oxygen concentration greater than 99.5 percent or it could be oxygen enriched air having an oxygen concentration of at least 25 percent and preferably, greater than 30 percent.

In the presence of this oxidant, the mixture containing halogenated waste and water is combusted in the combustion zone (2) having upstream and downstream thermocouples (11 and 12 respectively). The flame resulting therefrom is cooled via an aqueous solution which is pumped through the conduit (15) and introduced or injected through a nozzle means (10) located in the external annulus. The location of said nozzle means, however, is not critical as long as the location and/or shape of the nozzle means (10) is such that the aqueous solution is sprayed directly into or around the flame. The amount of the aqueous solution employed is dependent on the temperature and flame length in the incinerator. The preferred aqueous solution used in the Venturi mixer (9) or equivalent thereof and injected through the nozzle means (10) is pure water or chemically contaminated water derived from the chemical plant where the haloginated waste is originated. The use of contaminated water from the chemical plant in the operation of this invention is advantageous in that both the halogenated hydrocarbon waste and chemically contaminated water can be treated simultaneously in the instant incineration process. Consequently, the need for treating chemically contaminated water in watertreating plants is substantially reduced.

During the incineration, air is prevented from entering the combustion zone (2) by the tight construction of the shell of the incinerator. By preventing air infiltration into the combustion zone, the attainment of a substantially homogeneous temperature profile along the length of an incinerator is enhanced. Moreover, the off-gas (combustion gases or flue gas) volume is reduced, thus increasing the residence time.

The flue gas resulting from the incineration travels from the combustion zone (2) to an adjacent postcombustion zone (3), which is normally an expansion of the combustion zone having a downstream thermocouple (13). The traveling flue gas usually contains, inter alia, halogen, $H_2O$ vapor and $CO_2$. At the postcombustion zone (3), the halogen and water vapor in the flue gas react with one another to form acid. This formed acid is recovered after it is quenched in the quenching zone (4). The quenching zone (4) is located at a downstream of the post combustion zone (3), where the chemical equilibrium is frozen by sudden cooling. The primary purpose of the quenching zone is to prevent the acid formed in the postcombustion zone from redecomposing into the halogen products, thereby increasing the halogen conversion yield. The recovered acid can be reused or reutilized as a halogen source for halogen utilizing processes. Alternatively, the acid can be neutralized with an alkaline material and then can be disposed in an environmentally safe manner.

The following examples serve to further illustrate the invention. They are presented for illustrative purposes and are not intended to be limiting.

EXAMPLE 1

An industrial incinerator having an oxygen burner, a combustion zone, a reaction or postcombustion zone and a quenching zone, similar to that shown in the FIG. 1 was operated at about atmospheric pressure to incinerate chlorinated hydrocarbon liquid waste containing materials. The oxygen burner was made up of three pipes arranged coaxially to each other. Through the innermost feed pipe, the chlorinated hydrocarbon liquid waste was introduced at about 350 kg/hr into the combustion chamber. Oxygen was introduced at about 300 Nm$^3$/hr through an internal annulus formed by placing a second pipe concentrically over the innermost pipe to combust the chlorinated hydrocarbon waste. Additional oxygen was also introduced at about 60 Nm$^3$/hr through an external annulus, which is formed by placing a third pipe concentrically over the second pipe, to enhance the combustion rate. Around the second pipe, three nozzles were installed in the external annulus to spray water at about 800 kg/hr to the flame resulting from the combustion of the waste in the presence of oxygen. The temperature of the combustion zone was regulated to prevent damage to the refractory wall of the combustion zone. No attempt, however, was made to reduce air infiltration to the combustion zone. The temperatures at the upstream and downstream of the combustion zone and the temperature at the downstream of the reaction zone were determined via thermocouples 11, 12 and 13 respectively. It was found that the temperature at the thermocouple 11 on the top was 1,380° C. whereas at the thermocouple 13 below, the temperature dropped to 760° C. The conversion from $Cl_2$ to HCl was comparable to those incineration processes which employ air burners. However, the residence time was increased by 118%, due to the reduction of the off-gas rate (combustion gas formation rate).

EXAMPLE 2

The above test was repeated under similar operating conditions except that the chlorinated hydrocarbon containing waste was premixed with water through a venturi type mixer. About 526 kg/hr of waste was premixed with about 220 kg/hr of water. The amount of air infiltrated into the combustion zone was kept same as in Example 1. The chlorinated liquid waste was then incinerated in the presence of the oxygen which was introduced through the internal annulus at about 400 Nm$^3$/hr (cubic meter per hour). Additional oxygen was also introduced at about 80 Nm$^3$/hr through the external annulus. The test results indicate that the incineration throughput and HCl yield are substantially increased as compared to Example 1. The throughput was increased by about 176 kg/hr or 50% and the residence time of the combustion gases was increased from 0.8 sec. to 1.47 sec. or 83.7%. The temperature profile along the length of the incinerator also shows a remarkable difference and regularity as compared to Example 1. The thermocouple 11 on the upstream shows 1,400° C. whereas the downstream thermocouple 13 shows a temperature of 1,100° C., which is a slight temperature drop as compared to Example 1.

The present invention proved to be surprisingly useful in increasing the incineration throughput, increasing the residence time, increasing the acid yield, reducing the halogen released from the stack to atmosphere and reducing the risk of refractory wall damage when the flame length and temperature are controlled in the above manner. This invention is also advantageous in that chemically contaminated water can be simultaneously treated while incinerating the waste, thereby reducing the need for treating chemically contaminated solution in watertreating plants. These surprising and unexpected results are found to be possible due to the recognition that the use of an aqueous solution as a part of a halogenated hydrocarbon waste containing mixture and as a direct cooling means as described above, provides a substantially homogeneous temperature profile.

Although the process of the invention has been described in detail with reference to certain embodiments, those skilled in the art will recognize that there are other embodiments of the invention within the spirit and scope of the claims.

What is claimed is:

1. A process for regulating or controlling the temperature and the flame length in an incinerator having combustion, and postcombustion zones comprising:
   (a) mixing halogenated waste with an aqueous solution to form a mixture having a preselected heating value;
   (b) introducing said mixture into said combustion zone in the presence of oxidant to engender a flame; and
   (c) spraying an additional aqueous solution directly into or around said flame.

2. A process according to claim 1 wherein said halogenated waste comprises chlorinated hydrocarbons.

3. A process according to claim 2 wherein said aqueous solution is chemically contaminated water or pure water.

4. A process according to claim 1 wherein said mixing is accomplished by using a venturi mixer.

5. A process according to claim 1 wherein the amount of water in the mixture is such that the mixture has a heating value of about 800 Kcal/kg to about 3,500 Kcal/kg.

6. A process according to claim 1, wherein said postcombustion zone is a reaction zone.

7. A process according to claim 1, wherein the pressure of the incinerator is kept at about atmospheric pressure.

8. A process according to claim 1, wherein said oxidant has an oxygen concentration of at least about 25% by volume.

9. A process for obtaining a substantially homogeneous temperature profile along the length of an incinerator during the incineration of halogenated waste containing materials comprising:
   (a) providing a mixture containing an aqueous solution and halogenated waste containing materials having a heating value of about 800 Kcal/kg to about 3,500 Kcal/kg;

(b) introducing said mixture into said incinerator in the presence of oxidant to engender a flame; and (c) moderating the flame temperature by spraying an aqueous solution into or around the flame.

10. A process for obtaining a substantially homogeneous temperature profile along the length of an incinerator during the incineration of halogenated waste containing materials comprising:

(a) providing an oxygen burner having at least three pipes which are arranged coaxially to each other, (b) introducing a mixture containing halogenated waste and an aqueous solution into a combustion zone through the innermost pipe of said oxygen burner, (c) introducing oxidant into said combustion zone through an internal annulus formed by a concentrically placed second pipe, (d) introducing additional oxidant through an external annulus formed by a concentrically placed third pipe, (e) producing a flame by combusting said mixture in the presence of both the oxidants, and (f) spraying an aqueous solution directly into or around said flame via nozzles means located within said external annulus.

* * * * *